June 17, 1930.  W. C. FOWNES, JR., ET AL  1,764,717
BORING AND TAPPING MACHINE
Filed June 24, 1927  4 Sheets-Sheet 1

June 17, 1930.  W. C. FOWNES, JR., ET AL  1,764,717
BORING AND TAPPING MACHINE
Filed June 24, 1927    4 Sheets-Sheet 2

June 17, 1930.   W. C. FOWNES, JR., ET AL   1,764,717
BORING AND TAPPING MACHINE
Filed June 24, 1927   4 Sheets-Sheet 3

INVENTORS
William C. Fownes, Jr.,
Charles P. Barton, and
William G. Benninghoff
By Brown & Critchlow
their attorneys.

Witnesses:
B. Bagstevold
William B. Jaspert.

Patented June 17, 1930

1,764,717

UNITED STATES PATENT OFFICE

WILLIAM C. FOWNES, JR., OF PITTSBURGH, AND CHARLES R. BARTON, OF SEWICKLEY, PENNSYLVANIA, AND WILLIAM G. BENNINGHOFF, OF CLEVELAND, OHIO, ASSIGNORS, BY MESNE ASSIGNMENTS, TO SPANG, CHALFANT & COMPANY, INC., OF PITTSBURGH, PENNSYLVANIA, A CORPORATION OF PENNSYLVANIA

BORING AND TAPPING MACHINE

Application filed June 24, 1927. Serial No. 201,128.

This invention relates to boring and tapping machines, and more particularly to a combination boring and tapping machine especially adapted for the boring and tapping of pipe coupling sleeves and the like.

An object of the invention is to provide an improved machine having boring and tapping spindles with their axes in parallel alignment and in alignment with a common work support whereby the work to be acted upon is successively aligned with both spindles of the machine without changing the position of the work in its support.

Another object is to provide a boring and tapping machine adapted to feed the work in the direction of the cutting tool at a predetermined rate of feeding, and further adapted to quickly return the work to the work support after it has been acted upon by the cutting medium.

Another object is to provide a boring and tapping machine of the character described embodying means for automatically rendering the feed and feed reversing mechanism operative at given periods of the operating cycle.

Another object is to provide chucks or work holders for securing the work adapted to cooperate with the work support in a manner that will permit of turning the work holder or chucks 180° on the support to permit machining on both sides of the work without changing the location of the work piece in its engaging chuck.

Another object is to provide means for supporting pipe couplings in a manner to produce a tapped bore entering from opposite sides and converging in or near the center of the work piece with the axes of the respective bores in substantially parallel alignment.

Another object is to provide a boring and tapping machine of the character explained which shall be of simple and durable mechanical construction, simple and efficient in its operation, and especially applicable to the boring and tapping of relatively large cylindrical couplings for pipe lines.

Figure 1:
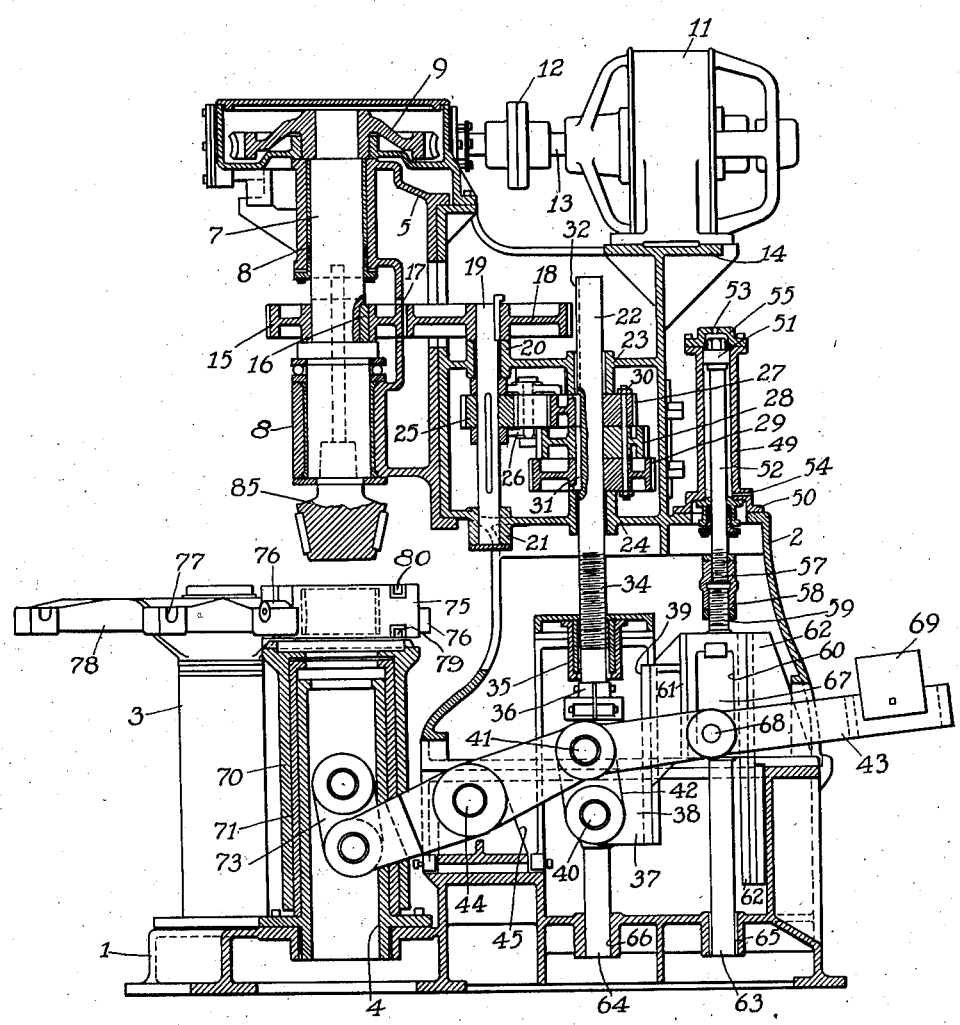
Figure 2:
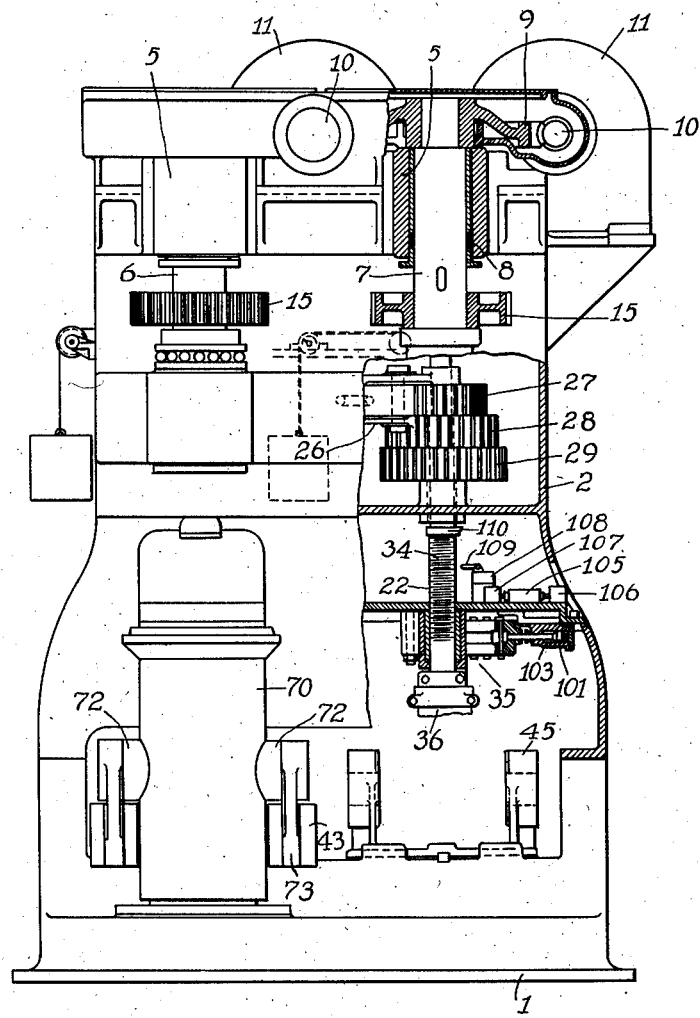
Figure 3:
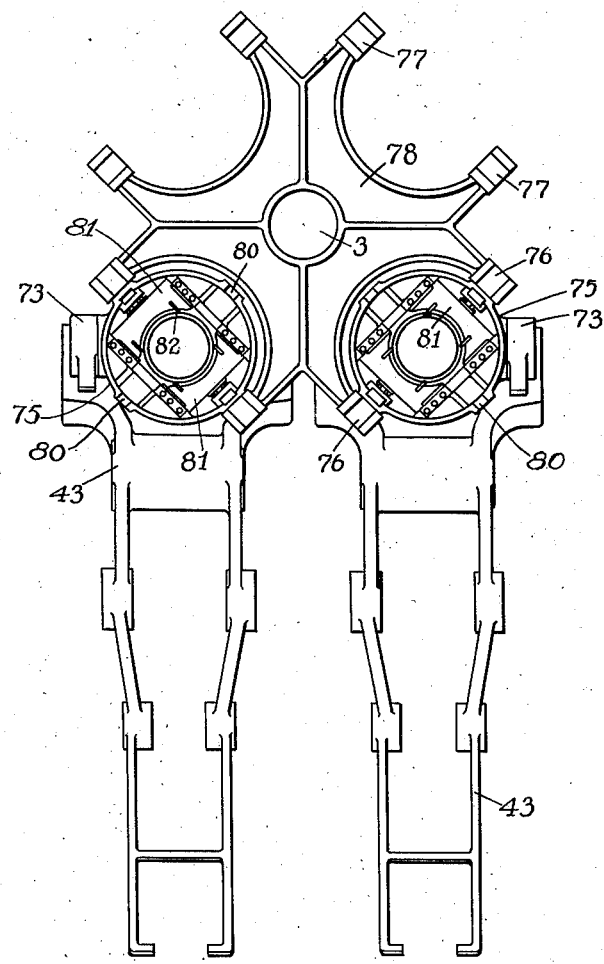

The invention is illustrated in the accompanying drawings in which Fig. 1 is a vertical view, partly in elevation and partly in section, of a combined boring and tapping machine; Fig. 2 a front elevation thereof partially in section; Fig. 3 a top plan view of a turn-table or work support illustrating the connection of a pair of levers for lifting the work from the support to feed it in the direction of the cutting medium; and Figs. 4 and 5 a top plan and side elevational view, respectively, the latter being partially in section, illustrating a feed-nut mechanism for a purpose hereinafter set forth.

Referring to Figs. 1 and 2 of the drawings, the machine comprises a base 1 upon which a housing 2, a turn-table column 3 and a work-lifting pedestal sleeve support 4 are mounted. Secured to the front of the machine housing are a plurality of head-stocks 5 for mounting work spindles 6 and 7, which are journalled for rotation in bearings 8 of the head-stocks. Spindles 6 and 7 are operatively connected by worm gears 9 and worms 10 to drive motors 11, the worms 10 being connected through flexible couplings 12 to motor shafts 13. The motors 11 are mounted on a substantially flat top portion of the machine housing provided for this purpose.

As shown in Fig. 1, head-stock journal 8 is divided to provide a space for a gear wheel 15 which is secured by a key 16 to rotate with spindle 7. Gear 15 projects through an opening 17 in the casing to intermesh with a gear 18 keyed to a shaft 19 which is journalled at 20 and 21 in the machine housing. Shaft 19 is in parallel alignment with a lead or feed-screw 22 journalled at 23 and 24 in the machine housing. In addition to gear wheel 18, shaft 19 carries gear wheel 25 which cooperates with a change gear mechanism 26 to selectively engage one of a plurality of gear wheels 27, 28 and 29. These gears are secured by bolts 30 to form a unitary element which is provided with a key 31 adapted to slide in a keyway 32 of the feed-screw 22 so that the latter may rotate with the gear wheel but be free to move in an axial direction independent of said gears. Gear wheel 25 is similarly movable on its shaft 19 for changing its position relative to gear wheels 27, 28 and 29 by means of the change gear mechanism 26. By virtue of this gear mechanism feed-screw 22 is rotatable at a selective speed by positive gear connections with the work spindle 7 to maintain a fixed relative speed of rotation with such spindle. This entire mechanism is duplicated for rotating spindle 6.

Figure 4:
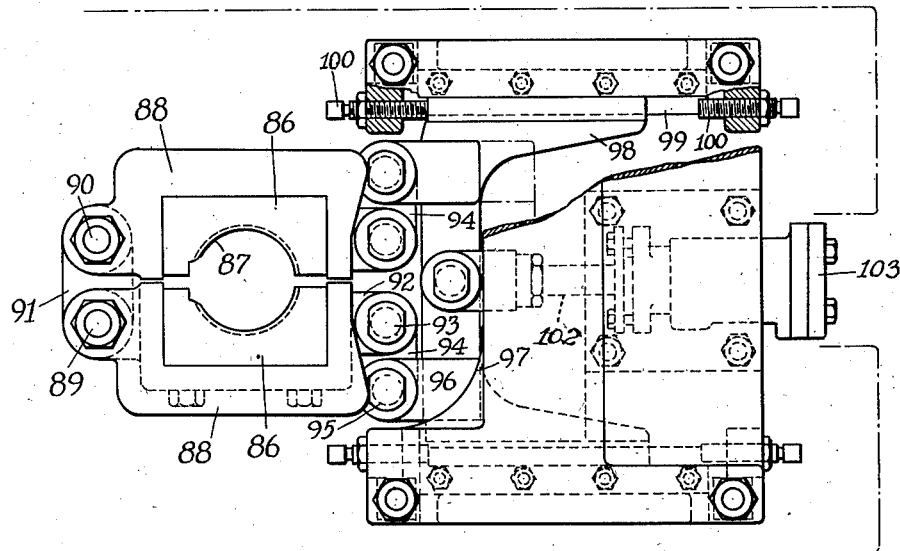
Figure 5:
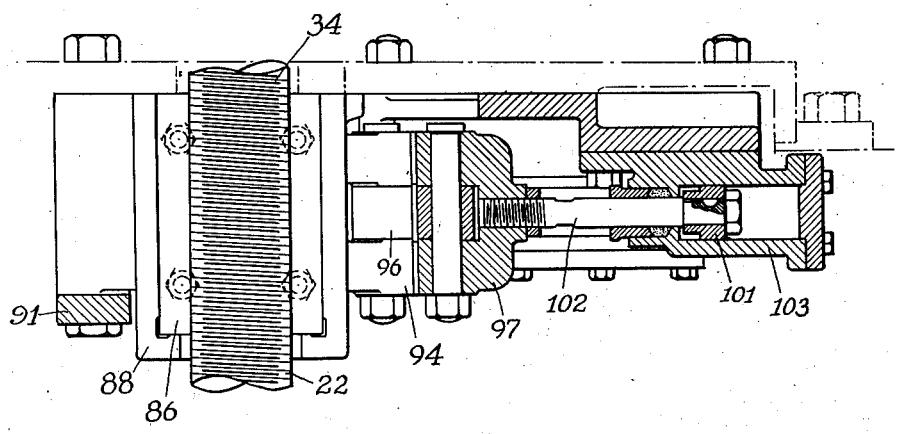

Feed-screw 22 is provided with threaded portion 34 near its lower end which interacts with a split nut feed mechanism generally designated at 35, but which will be more fully explained with particular reference to Figs. 4 and 5 of the drawings. At its lower end feed-screw 22 is connected by a coupling 36 to an eye-link 37 provided with a laterally projecting portion 38 having a slotted face or guide-way, not shown, which engages a guide 39 on machine housing 2. Eye-link 37 is provided with two sets of openings, the upper of which are slotted, to receive pins 40 and 41, the ends of which engage links 42 pivotally connected through pins 41 to a bifurcated lever 43. This lever is pivoted at 44 on a fulcrum bearing 45 secured to the base 1 of the machine. Movement of lever 43 about its fulcrum 44 produces movement of the feed-screw 22 in the axial direction by reason of its connection by links 42 to the connecting eye-link 37, and, when it is rotated, axial movements of the feed screw cause lever 43 to rock on its pivot point 44.

An air or other pressure fluid cylinder 49, having its axis parallel with that of feed-screw 22, is secured by a flange 50 to machine housing 2, as shown in Fig. 1. A piston 51 attached to a piston rod 52 is vertically movable in cylinder 49 responsive to the application of fluid pressure at ports 53 and 54 in cylinder head 55 and flange 50, respectively.

Piston rod 52 is provided with threaded portion 57 by means of which it is coupled by a sleeve 58 to the threaded portion 59 of a block 60 provided with guide-ways which cooperate with guides 61 and 62 of the machine housing. Block 60 and eye-link 37 are provided with pilots or guide rods 63 and 64, respectively, extending through openings 65 and 66 provided in machine base 1. Block 60 is further provided with an elongated or slotted opening 67 which receives a pin 68 projecting through lever 43, the extremities of the slot 67 forming stops which limit the movements of pin 68 in a manner hereinafter explained. A counterweight 69 may be adjustably positioned on the extended end of lever 43, as shown in Fig. 1.

Work-lifting pedestal sleeve supports 4 (Fig. 1) are in axial alignment with tool spindles 6 and 7, and each forms a guide for a pedestal sleeve 70 mounted for vertical movements on bushings 71 which surround the pedestals. These sleeves are provided with trunnions 72 for receiving links 73 extending upwardly from the bifurcated end of lever 43, and are movable vertically in response to the pivotal movements of lever 43 about its pivot point 44 to raise and lower work in alignment with the cutters on the tool spindles.

The pedestal sleeve in its vertical movement engages chuck-frames 75 provided with trunnions 76 which lie in suitable trunnion bearing supports 77 of a turn-table 78 rotatably mounted on column 3. Chuck-frames 75 are adapted to be raised out of engagement with trunnion bearing supports 77 of the turn-table by pedestal sleeves 70. Within these frames there are shown clamps or grippers 81 engaging pipe coupling sleeves by jaws 82. To prevent the chuck frames from rotating when elevated to present couplings to rotary boring or tapping tools, the upper ends of sleeves 70 are provided with pins 79 which engage notches 80 in the frames.

The trunnion bearing supports 77 of turn-table 78 are spaced at equal angular intervals, the drawings showing four supports spaced at intervals of 90°, so that the work is maintained at fixed relative positions on the table. When the table is turned to transfer a blank from alignment with tool spindle 6, it will bring into alignment with tool spindle 7 the blank previously acted upon by the tool attached to spindle 6. After a pipe coupling or other blank has been bored and tapped from one of its ends, and the turn-table has been rotated to cause the tapped blank to be clear of the tapping tool, the chuck frame 75 in which the blank is mounted is rotated on its trunnions 76 through an angle of 180° to bring the opposite end of the coupling into position for being acted upon by the boring and tapping tools. Because the turning of the work is done by bodily rotating a chuck frame on which the work is mounted, the coupling is maintained in axial alignment for boring and tapping both of its ends. It is of course possible on account of the varying thickness of the wall of the pipe coupling that the threaded bore completed in the initial machining operation is slightly off center with the threaded bore completed after the chuck frame has been turned on its trunnion support in the manner described. However this is unimportant as long as the axes of the opposite bores are maintained in substantial parallel alignment.

Referring to Figs. 2, 4 and 5, the feed-nut mechanism, generally designated at 35, comprises a pair of cooperating half-nut members 86 having their adjacent faces provided with threads 87 corresponding to threaded portion 34 of feed-screw 22. The nut members 86 are mounted in holders 88 pivotally connected at 89 and 90 to a connecting link 91. The other ends of these holders are provided with lugs 92 by means of which they are pivotally connected at 93 to links 94 which in turn are pivoted at 95 to the legs 96 of a cross-yoke 97. This yoke is provided with guides 98 slidably mounted in guide-ways 99 between the limits of the adjustable set screw stops 100. Yoke member 97 is moved in its guide-way by a piston 101 to which it is connected by piston rod 102. The piston is in an air or other pressure fluid cylinder 103, and is actuated by the fluid-pressure applied to either end of the piston to reciprocate yoke member 97 for engaging and disengaging nut elements 86 with threaded portion 34 of feed-screw 22.

The opening and closing of the feed-nut actuating mechanism 35 is controlled by an electro-responsive valve mechanism 105 shown in Fig. 2. The valve employed in this mechanism is so designed that when it is in one of its operating positions it permits fluid under pressure to be admitted through suitable ports to one end of cylinder 103 to cause piston 101 to be moved in a direction to close the feed-nut mechanism, and when it is in its other operating position it permits pressure to be admitted to the other end of cylinder 103 to cause piston 101 to be moved in the other direction, to open the feed-nut mechanism. For moving the valve from one of its operating positions to the other, there are a pair of solenoids 106 and 107 adapted when energized to act upon a pair of armatures, operably connected to the valve. The energization of these solenoids is controlled by a switch 108, which in turn is actuated by a switch arm 109 disposed in the path of a switch cam 110 mounted on feed screw 22. This switch arm is so arranged that when it is in its normal position as shown in Fig. 2, it causes such of the solenoids to be energized as are employed to actuate the valve to its feed-nut opening position, and when engaged and forced down by cam 110 it effects the energization of the other solenoid employed to move the valve to its feed-nut closing position. To permit the operation of switch 108 in the manner explained, switch arm 109 is mounted on the switch in such a way as to allow cam 110 to displace it on the up stroke of the feed screw without affecting the operation of either of the solenoids.

In order to vary the length of the boring and tapping operation as governed by the feed-nut mechanism, cam 110 extends outwardly a gradually increasing distance from, and is rotatably mounted on, feed-screw 22 so that it may be angularly adjusted to vary the length of time switch arm 109 will be held down by the cam on the downward stroke of the feed-screw, thereby determining the distance the boring and tapping tools will cut into the couplings.

The operation of the combined boring and tapping machine is as follows: Referring to Fig. 3, a piece of work to be acted upon, such as a pipe coupling, is first firmly secured in one of the chucks 81 mounted in one of the chuck frames 75 pivotally cradled in the trunnion bearing supports 77 in the turn table 78. There are of course four of these chuck frames corresponding to the four supports or sections of the turn-table 78. The turn-table with the pipe couplings thus mounted is rotated to advance the chuck frame in which the coupling is secured to a position which brings the coupling in axial alignment with tool spindle 6 which is equipped with a suitable boring tool for cutting a circular bore in the coupling. The chuck frame or workholder, as it is commonly called, and coupling are then raised by means of the work raising and feeding mechanism, and the coupling is fed to the boring tool. While this coupling is being bored another coupling is secured in the chuck frame disposed in the next succeeding section of the turn-table. After the boring operation on the first coupling is completed, the workholder in which it is mounted is lowered so that its trunnions 76 again rest in trunnion bearing support 77, and the turn-table then advanced to bring the bored coupling in alignment with a collapsible thread cutting tool or tap 85 secured to the lower end of tool spindle 7, as shown in Fig. 1, and the newly mounted coupling in alignment with spindle 6. The two workholders in which these couplings are mounted are then raised and fed to the boring and tapping tools, respectively. During this boring and tapping operation another new coupling is mounted in the next succeeding section of the turn-table. After the thread has been formed on the one coupling and the other bored, the two are once more lowered to the turn-table which is advanced to bring the threaded coupling to the position of the upper right-hand section of the turn-table, as seen in Fig. 3, and the next two succeeding couplings into alignment with spindles 6 and 7. These latter couplings are then raised and fed to the cutting tools, and while they are being bored and tapped the chuck frame or workholder, in which the coupling having a thread formed in its one end is mounted, is rotated through an angle of 180° on its trunnions 76, making the other end of the coupling ready to be subsequently advanced to and acted upon by the boring and tapping spindles in the manner just described. At the same time, another unbored coupling is mounted in the chuck frame positioned in the upper left-hand section of the turn-table. Thereafter the feeding of couplings to the machine is continued, and after the first coupling has been tapped on both ends, it is removed from its chuck frame and a new coupling substituted for it, the operation being continued without interruption.

The work supported on turn-table 78 is fed upwardly by raising it to the boring and tapping tools through lever 43 which is actuated by feed-screw 22 and piston 51. In this operation sleeve pedestal 70 engages the bottom of chuck frame 75 and raises it bodily from its trunnion bearings 77 in the direction of the boring or tapping tool, and the feed mechanism is designed to raise the work by a quick movement to approach the position of contact with a cutting tool, and to subsequently feed the work gradually onto the tool for the remainder of a machining operation, the chuck frame being held against rotation by pins 79 on pedestal 70. When the boring and tapping operations are completed, the feed nut mechanism is automatically released through the operation of cam 110, and the raising and lowering mechanism then actuated under manual control to return the work to the turn-table in one rapid stroke.

These varying feeding functions are accomplished in the following manner: Assuming the work holder to be at rest on turn-table 78 as shown in Fig. 1, with lever 43 in the position shown and feed-nut mechanism 35 out of engagement with feed-screw 22, air is caused to flow through port 53 of the head 55 of cylinder 49 to displace piston 51, which then rapidly moves downwardly in the cylinder. During a portion of the piston travel corresponding to the length of slotted opening 67 in slide block 60 lever 43 will not be disturbed. When the upper horizontal portion of block 60 strikes pivot bolt 68 of the lever, the lever is moved downwardly a distance corresponding to the space between the work and the cutting bit, such as the tap 85. During that portion of the piston stroke in which lever 43 is actuated, feed-screw 22, being free of feed-nut mechanism 35, will freely move downwardly, then sliding in the bores of gear wheels 27, 28 and 29.

When piston 51 has reached its lower-most position, feed-screw 22 will have been forced downwardly an amount corresponding to the spacing of switch cam 110 and switch arm 109, Fig. 2. Accordingly, when the latter is tripped by cam 110 valve mechanism 105 actuates feed-nut piston 101 to bring the nut mechanism in engagement with threaded portion 34 of feed-screw 22. Since the feed-screw is continuously rotated from the tool spindle 7 by its gear connection therewith, rotation of the feed-screw after the feed-nut mechanism is in engagement therewith will cause it to advance downwardly and produce a corresponding downward movement of the long end of lever 43 to raise its other end and pedestal 70 to feed work onto the cutting tool.

The rate of feeding may be controlled by the change gear mechanism 26 in accordance with whether the particular operation is boring or tapping. In the tapping operation the rate of feeding the work onto the tap must of course correspond to the lead of the thread of the tapping tool. After the machining operation is completed, that is, when the work has been fed a proper distance onto the tool, the feed-nut mechanism is automatically released. Pressure is then communicated manually through port 54 of cylinder 49 to raise piston 51 to its upper position shown in Fig. 1 and raise the long end of lever 43 to lower the pedestal 70 to bring the chuck-frame 75 to rest on its turn-table trunnions 77.

It will be noted that, during the initial work-lifting movement of piston 51, pin 68 extending through the elongated opening 67 of the slip link rests against the upper end of block 60. Further movement of lever 43 as affected by feed-screw 22 in the manner heretofore explained permits lever 43 to move downwardly unimpeded by slip block 60 since lever pin 68 is free to traverse the length of slot 67. At the end of the feeding movement pin 68 lies at or near the bottom of slot 67 so that when piston 51 is raised lever 43 responds to its lifting movement and returns the work to its support on the turn-table in a single rapid stroke.

It is evident from the foregoing description of this invention that a combined boring and tapping machine made in accordance herewith provides simple and efficient means for boring and tapping pipe couplings from two sides with the axes of the bores in parallel alignment. It is evident of course that machines of the character herein described may be utilized for machining any articles from opposite sides and in which it is desired to maintain proper alignment.

According to the provisions of the patent statutes, we have explained the principle and operation of our invention, and have illustrated and described what we now consider to represent its best embodiment. However, we desire to have it understood that, within the scope of the appended claims, the invention may be practiced by machines other than that specifically illustrated and described.

We claim as our invention:

1. In a boring and tapping machine, the combination of a work support, a machine tool in alignment therewith, means for operating said tool, and means for initially raising work from said support to a position adjacent the tool, then positively feeding the work at a predetermined rate of speed in co-ordination with the operation of said tool, and subsequently lowering the work to its support.

2. In a boring and tapping machine, the combination of a rotatable turret provided with holders for supporting work at uniformly spaced angular intervals, boring and tapping tools in alignment with each adjacent pair of said holders, means for rotating said tools, means for rapidly elevating work from each holder to positions adjacent said tools and for rapidly returning it to the holders, and means coordinated with said tool rotating means to feed work from its elevated positions to said tools.

3. In a boring and tapping machine, the combination of a rotatable turret provided with a plurality of trunnion bearing supports for rotatably supporting on horizontal axes work at uniformly spaced angular intervals, boring and tapping tools in alignment with each adjacent pair of said trunnions, means for rotating said tools, means for rapidly elevating work from said trunnion bearing supports to positions adjacent said tools and for rapidly returning it to the trunnion-bearing supports, and means coordinated with said tool rotating means to positively feed work at a predetermined rate of speed from its elevated positions to said tools.

4. In a tool operating machine, the combination of a vertically movable work holder support, a tool rotatable on a vertical axis in alignment with said support, means for rotating said tool, a lever connected to said support for moving it, a lead screw connected to said lever and to said tool-rotating means for moving the lever, a prime mover also connected to said lever for moving it, and means rendered effective by and upon a predetermined movement of said lever by said prime mover to render said lead screw effective to further move the lever to feed work to said tool.

5. In a boring and tapping machine, the combination with a movable work support, of a tool spindle in alignment therewith, a tool mounted on said spindle, a lever connected at one end to said work support for raising and lowering it, a feed-screw connected to said lever, and a fluid pressure actuated piston connected to said lever, said feed-screw and piston being adapted to cooperate in, first, rapidly raising the work support to a position adjacent the tool, second, feeding the support in the direction of the tool at a speed coordinate with the cutting speed of the tool, and third, returning the support from its upper to its lowermost position by a single rapid stroke.

6. In a boring and tapping machine, the combination with a movable work support, of a tool spindle in alignment therewith, a tool mounted on said spindle, a lever connected at one end to said work support and adapted to raise and lower the same, a feed-screw pivotally connected to said lever, a slip link associated with said lever, and a fluid pressure actuated piston connected to said slip link, said lever being connected to the feed-screw in a manner to permit movement of the lever independently of the rotation of the screw, and said lever being further connected to said slip link to permit limited movement of said piston without effecting movement of the lever.

7. In a boring and tapping machine, the combination with a movable work support, of a tool spindle in alignment therewith, a tool mounted on said spindle, a lever connected at one end to said work support and adapted to raise and lower the same, a feed-screw geared to said spindle and pivotally connected to said lever, a fluid pressure actuated piston connected to said lever, a feed-nut mechanism for engaging with said feed-screw, and means for rendering said feed-nut mechanism operative to engage said screw to effect a portion of the lever movement and to render it inoperative when said lever is actuated by said piston.

In testimony whereof we hereunto sign our names.

WILLIAM C. FOWNES, Jr.
CHARLES R. BARTON.
WM. G. BENNINGHOFF.